United States Patent [19]
Lee

[11] Patent Number: 5,269,248
[45] Date of Patent: Dec. 14, 1993

[54] SHOCK ABSORBING FENDER FOR VESSELS

[76] Inventor: Sang Choon Lee, 106-34, Dogok-Ri, Hapduk-Eup, Dangin-Koon, Choongchungham-Do, Rep. of Korea

[21] Appl. No.: 678,968
[22] PCT Filed: Aug. 4, 1990
[86] PCT No.: PCT/KR90/00008
§ 371 Date: Apr. 23, 1991
§ 102(e) Date: Apr. 23, 1991
[87] PCT Pub. No.: WO91/01913
PCT Pub. Date: Feb. 21, 1991

[30] Foreign Application Priority Data

Aug. 4, 1989 [KR] Rep. of Korea .......... 11178

[51] Int. Cl.$^5$ ............................. B63B 21/00
[52] U.S. Cl. ................................. 114/219
[58] Field of Search ........... 114/219, 220; 405/212, 405/213, 215; 267/139, 140; 293/102, 107, 110, 120, 122, 124, 125, 136

[56] References Cited

U.S. PATENT DOCUMENTS

| | | | |
|---|---|---|---|
| 3,455,269 | 7/1969 | Dean | 114/219 |
| 4,098,211 | 7/1978 | Files et al. | 114/219 |
| 4,143,612 | 3/1979 | Ticknor | 114/219 |
| 4,273,065 | 6/1981 | Lindsay et al. | 114/219 |
| 4,320,913 | 3/1982 | Kuroda | 293/122 |
| 4,357,891 | 11/1982 | Sluys | 114/219 |

Primary Examiner—David M. Mitchell
Assistant Examiner—Stephen P. Avila
Attorney, Agent, or Firm—Christie, Parker & Hale

[57] ABSTRACT

A shock absorbing fender for vessels provided on a vessel or shore wall and the like prevents shock damage caused by contact between vessels or contact between a vessel and a shore wall at the time of coming alongside the pier. The shock absorbing fender is comprised of a linear inner tube (1) formed integrally with internal shock absorbing structure (3), a cylindrical body (4) made of elastic material for forming an outer fender body, and a plurality of hollow tubes (5) arranged around the linear inner tube (1) embedded within the cylindrical body (4). According to the invention, the size of the magnitude of the fender is miniaturized but high shock absorbing capacity is exerted, and even if it is utilized in a large or super large vessel, the shocking load is satisfactorily absorbed whereby damage to both the vessel itself or the installation for coming alongside the shore is prevented. High shock absorbing capacity is equally exerted irrespective of the direction of shocking load.

4 Claims, 3 Drawing Sheets

SHOCK ABSORBING FENDER FOR VESSELS

TECHNICAL FIELD

The present invention relates to a shock absorbing fender provided on vessels or coastal wall in order to prevent shocking damage caused by contact between vessel and vessel or contact with a coastal wall at the time of a vessel coming alongside pier, and more particularly to a shock absorbing fender for vessels which is made such a manner that tubular body formed integrally with shock absorbing structure within hollow of tube formed with elastic material such as rubber, elastic plastic or the like is used as a basic element, wherein tubular body having such structure is formed to a linear tube, circular tube or helical tube whereby plural number of such tubular bodies are arranged adjacent to each other around the exterior circumference of a central tube of linear tubular body and then their exterior surfaces are covered with elastic material, so that an integral cylindrical body is structured.

BACKGROUND ART

Conventionally, it has already been known that tubular body having section of circular, elliptic or similar form with these is formed with elastic material such as rubber or elastic plastic, and such a tubular body is utilized as a shock absorbing structure such as fender for vessels or bumper for vehicles.

And, also in designing a tubular body member having such a shock absorbing function, researches on the structure or sectional shape of member have been continued from long time ago for the purpose of improving durability and further enhancing shock absorbing function of member even while sectional area of member is reduced as far as possible whereby dimension of product and manufacturing cost are decreased, as a result, various ideas have been proposed. For example, techniques related to bumper for vehicles can be cited which are respectively disclosed in British Patent No. 1562254 granted to Aurelio Brollo of Italy and in U.S. Pat. No. 4,320,913 issued to Shigeharu Koroda of Japan. That is, in these patents, technique related to a bumper for vehicles is disclosed in which in forming tube tubular body with elastic material such as rubber or elastic plastic, shock absorbing structures with several partitions arranged within hollow of said tubular body so as to be crossed in X-shape by intersecting said hollow or in radial shape is formed integrally through lengthwise direction of the tubular body whereby toughness and restorability are increased, so that excellent shock absorbing capacity is included against highly shocking load even if a shock is applied from any direction.

And, a rubber bumper is known in which shock absorbing structures having different structure relative to that in aforementioned two patents is integrally formed within tubular body of circular or elliptic shape in section made of anti-elastic material, in international patent application PCT/KR85/00013 which is filed by the inventor of this application on Jun. 4, 1985 and published by International publication No. WO86/00051 on Jan. 3, 1986.

However, since the shock absorbing structure having structures as described above is designed suitably for utilizing as bumper for mainly vehicle, it is not suitable as a structure of fender for utilizing in medium or large vessels. A shock absorbing structure capable of equally using from small vessel to large or super large vessel is required in the case of fender for vessel, and since shocking load to be applied to the fender is also applied with further larger big load relative to the case of bumper for vehicle from irregular direction, a shock absorbing structure capable of absorbing effectively such a high shocking load is required.

SUMMARY OF THE INVENTION

Therefore, it is an object of the present invention to provide a shock absorbing fender for vessel in which magnitude of fender is miniaturized but high shock absorbing capacity is exerted whereby any shocking load is sufficiently absorbed even if it is utilized in large or super large vessel so that damaging of vessel itself or installation for coming alongside the shore is possible to be protected, as well as high shock absorbing capacity is possible to be equally exerted regardless of applying direction of shocking load.

To accomplish the object of the invention, tubular body formed integrally with shock absorbing structures within hollow of tube formed with elastic material such as rubber or elastic plastic is utilized as a basic element, and a plurality of tubular bodies having such structure are arranged so as to be superposed in double whereby one cylindrical combined body is structured, and then elastic material such as rubber is covered by molding method to exterior of this combined body, so that cylindrical main body of single body is structured.

The tubular bodies forming the combined body are formed with such form of circular tube or helical tube, and shock absorbing structural body formed integrally within these respective tubular body can be structured with partitions of X-shape or radial line shape or else other known various forms. And, said shock absorbing structures may be formed at least partially through lengthwise direction of tubular body, but it is preferred to be formed through entire length.

And, method for structuring the tubular structural body can be executed in various ways, but generally a tubular body of linear type is disposed at center and then a plurality of tubular bodies of circular type are serially arranged by adjoining each other around its circumference whereby a cylindrical combined body is structured, otherwise a tubular body of linear type can be disposed at the center and then other tubular bodies of linear type are arranged by adjoining each other around its circumference in parallel to lengthwise direction whereby a cylindrical combined body can be structured. And, a tubular body of linear type is disposed at the center and then other tubular bodies formed of helical tube form are arranged around its circumference whereby a cylindrical combined body can be structured.

DETAILED DESCRIPTION OF THE PREFERRED EMBODIMENTS

Hereinafter, preferred embodiments of the present invention will be described in detail with reference to the accompanying drawings.

Figure 1:
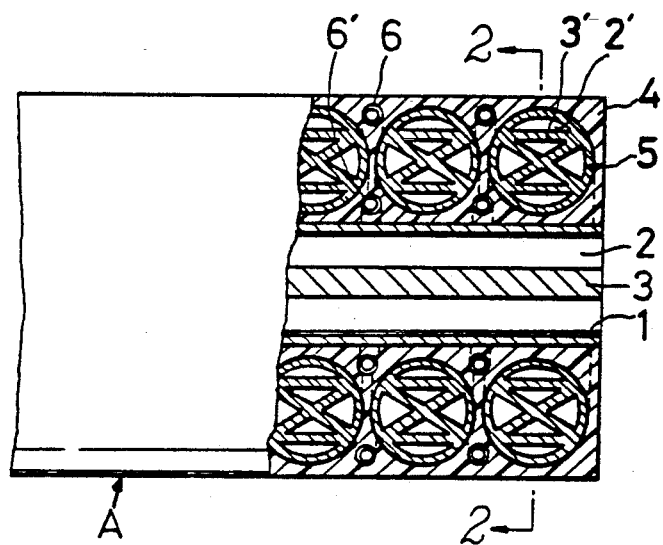
FIG. 1 is partly cut out longitudinal sectional view showing a fender according to a preferred embodiment of the present invention.
Figure 2:
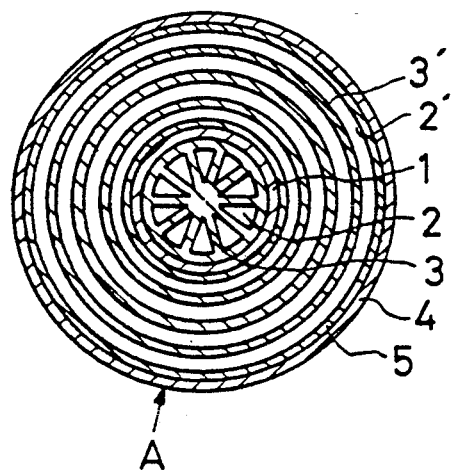
FIG. 2 is a cross sectional view taken along the line II—II of FIG. 1.

A preferred embodiment shown in FIGS. 1 and 2 is a first embodiment showing a primary form of a fender of the present invention, wherein reference symbol A represents a cylindrical fender. At the center of the fender A, there is located with linear inner tube 1 of hollow tube body made of elastic material such as rubber as reinforcing core material. And, within the hollow 2 of the linear inner tube 1, a shock absorbing structure is provided by extending in lengthwise direction so as to be integrally formed with the inner wall of the linear inner tube 1. On the circumferential surface of the linear inner tube 1, a cylindrical body 4 made of elastic material such as rubber is integrally formed thickly by a method such as molding. Within the interior of said cylindrical body 4, several outer tubes 5 of circular type having shock absorbing structure 3' within the interior of hollow 2' as well are embedded in a state of adjoining each other, and between these outer tubes 5 and 5' coil springs 6 and 6' are embedded so as to serve function of reinforcing core strip.

Since the fender having such a structure is formed with double structure in which hollow linear inner tube 1 and a plurality of outer tubes 5 having respectively shock absorbing structures 3 and 3' within the interior are combined in a direction of crossing each other, the shock absorbing function against a shock is very much excellent and it is suitable for using as a fender provided to the shore wall and the like of pier, and even if its magnitude is miniaturized, it can effectively absorb any large shock load applied at the time when large or super large vessel comes alongside the shore, even if any shocking load is successively applied from irregular direction during coming alongside the shore or after having come alongside the shore, these are satisfactorily endured, so that damaging of vessel body or mooring installation can be prevented.

Figure 3:
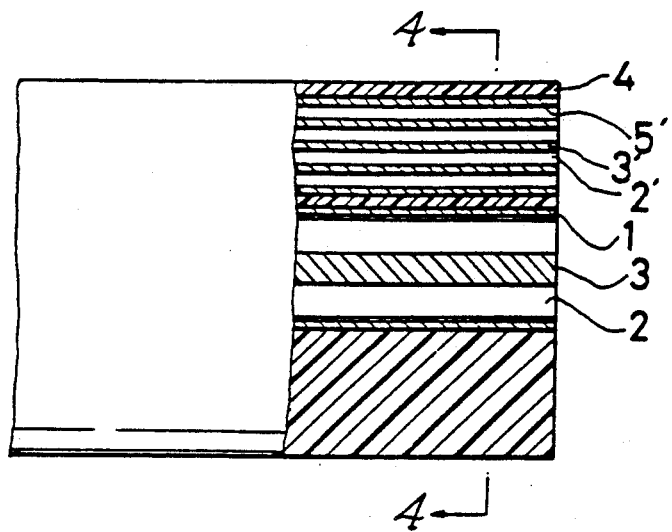
FIG. 3 is a partly cut out longitudinal sectional view showing a fender according to another embodiment of the present invention.
Figure 4:
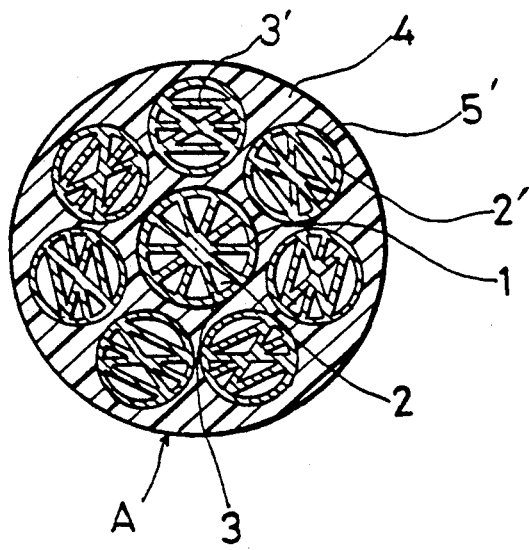
FIG. 4 is a cross sectional view taken along the line IV—IV of FIG. 3.

FIGS. 3 and 4 show another embodiment of the present invention, in this embodiment, within the interior of cylindrical body 4 of fender A, several hollow outer tubes 5' formed of linear tube type are arranged by assembling each other in parallel with the linear inner tube 1, this structure can also be expected with shock absorbing effect equal to the fender of the aforementioned first embodiment.

Figure 5:
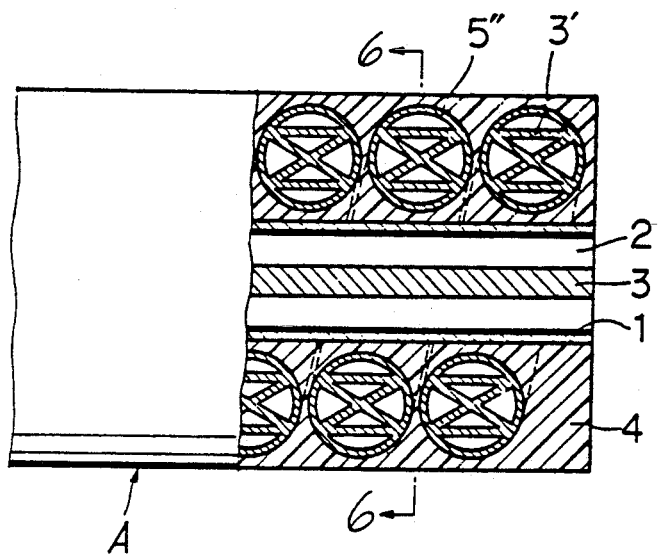
FIG. 5 is a partly cut out longitudinal sectional view showing a fender according to still another embodiment of the present invention.
Figure 6:
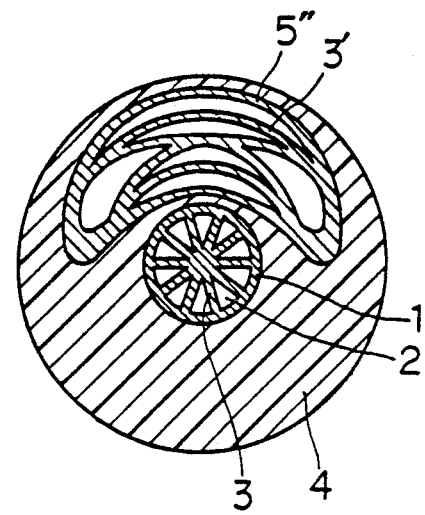
FIG. 6 is a cross sectional view taken along the line IV—IV of FIG. 5.

And, the embodiment shown in FIGS. 5 and 6 shows the third embodiment that the embodiment of FIG. 1 is changed. That is, in this embodiment, outer tube embedded within the cylindrical body 4 of fender A is formed in a form of helical tube 5" whereby it is embedded within the cylindrical body 4 by same manner as in the first embodiment.

Figure 7:
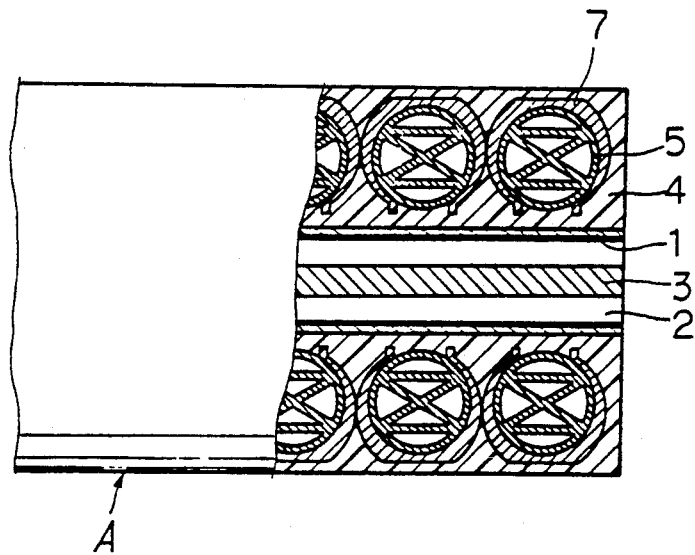
FIG. 7 is a partly cut out longitudinal sectional view showing a fender according to a further embodiment of the present invention.

FIG. 7 shows further embodiment of the present invention utilizing waste tires, wherein outer tubes 5 of circular tube form as in first embodiment are embedded within the body 4 in a state of inserting respectively into the interior of waste tire 7, in which shock absorbing capacity included with the tire itself is utilized, whereby shock absorbing capacity of fender can be more increased, as well as saving of material forming the body 4 is intended, and at the same time, in viewing from a point that the tires being of industrial waste material can be utilized, double effects are obtained.

In the above-described embodiments, it is described by citing examples that outer tubes are arranged in a row around the exterior circumference of linear inner tube, but it is possible to execute by arranging with two rows or three rows according to the required dimension of fender, a shock absorbing structures 3 and 3' formed integrally within the interior of the inner and outer tubes 1, 5, 5' and 5" can of course be executed by modifying into various forms other than exemplified structures.

What is claimed is:

1. A shock absorbing fender for vessels comprising:
   a cylindrical outer body made of an elastic material;
   a plurality of elastic shock absorbing tubes embedded within the outer body, each tube having an inner tube surface integrally connected with an inner shock absorbing structure for elastically resisting collapse of the tube, the inner shock absorbing structure comprising a plurality of elastic walls running lengthwise within the tube and radiating outwardly from a center line in the tube to the inner tube surface in a spoked fashion; and
   a plurality of coil springs embedded in the cylindrical outer body.

2. A shock absorbing fender for vessels comprising:
   a cylindrical outer body made of an elastic material;
   a central tube running lengthwise and embedded within the outer body; and
   a plurality of toroidal tubes that encircle the central tube and are embedded within the outer body;
   each of the central tube and toroidal tubes having an inner tube surface integrally connected with an inner shock absorbing structure for elastically resisting collapse of the tube, the inner shock absorbing structure comprising a plurality of elastic walls running lengthwise within the tube and radiating outwardly from a center line in the tube to the inner tube surface in a spoked fashion.

3. The shock absorbing fender of claim 2 further comprising a plurality of tires embedded within the outer body wherein each tire surrounds a toroidal tube.

4. A shock absorbing fender for vessels comprising:
   a cylindrical outer body made of an elastic material;
   a central tube running lengthwise and embedded within the outer body; and
   a long surrounding tube helically wound about the central tube and embedded within the outer body;
   each of the central tube and surrounding tube having an inner tube surface integrally connected with an inner shock absorbing structure for elastically resisting collapse of the tube, the inner shock absorbing structure comprising a plurality of elastic walls running lengthwise within the tube and radiating outwardly from a center line in the tube to the inner tube surface in a spoked fashion.

* * * * *